United States Patent [19]

Andrews

[11] 4,289,629
[45] Sep. 15, 1981

[54] REMOVAL OF CONTAMINANTS FROM STRONGLY ALKALINE SOLUTION

[75] Inventor: Claude R. Andrews, Pasadena, Md.

[73] Assignee: J. M. Huber Corporation, Locust, N.J.

[21] Appl. No.: 168,833

[22] Filed: Jul. 10, 1980

[51] Int. Cl.$^3$ .................... C01B 33/26; C01B 33/28
[52] U.S. Cl. ................... 210/737; 210/766; 423/327; 423/328; 423/421; 423/463
[58] Field of Search .............. 210/683, 737, 766; 423/328, 327, 421, 463

[56] References Cited

U.S. PATENT DOCUMENTS

| | | | |
|---|---|---|---|
| 2,208,173 | 7/1940 | Urbain et al. | 210/683 |
| 2,911,285 | 11/1959 | Earley et al. | 423/327 |
| 3,397,142 | 8/1968 | Guth et al. | 210/683 |
| 3,433,736 | 3/1969 | Guth et al. | 210/683 |
| 4,041,135 | 8/1977 | Williams et al. | 423/329 |

OTHER PUBLICATIONS

Chang, "Synthesis of Photochromic and Cathodochromic Sodalite", J. Electrochem. Soc., Solid-State Science and Technology (Jun. 1964), vol. 121, No. 6, pp. 815–819.

Primary Examiner—O. R. Vertiz
Assistant Examiner—Wayne A. Langel
Attorney, Agent, or Firm—Ernest A. Schaal; Harold H. Flanders

[57] ABSTRACT

The chloride ion and carbonate ion concentrations of a strongly alkaline solution can be reduced by the process of mixing sodium aluminosilicate into the solution, heating the resulting solution to a temperature of at least 90 degrees Celsius to form a sodalite type product, and filtering the sodalite type product from the solution.

2 Claims, 6 Drawing Figures

REMOVAL OF CONTAMINANTS FROM STRONGLY ALKALINE SOLUTION

BACKGROUND OF THE INVENTION

In general, the present invention relates to the removal of contaminants from strongly alkaline solutions. More specifically, it relates to the removal of chloride and carbonate contaminants from solutions containing at least 6% sodium oxide content.

U.S. Pat. No. 4,041,135 discloses a method for producing crystalline base exchange aluminosilicate materials having high total ion exchange capacities. An essential step in that method is treating aqueous process liquids containing alkali metal aluminate to remove halide impurities, organic discoloring complexes and ferruginous sludge, and adjusting to the desired concentration to form clarified aqueous process liquids to serve as a source of alkali metal aluminate in the initial reaction.

These impurities need to be removed because the commercial grade raw materials of that invention are typically produced in processes which give rise to halide (usually chloride) and carbonate contamination of the raw materials. Unless these impurities are removed, they will accumulate in the recycle stream and reach levels where they cause undesired reactions to occur.

These impurities can be removed by membrane-type cells, fractional crystallization, or similar units. They can also be removed by draining off some of the recycle stream to a waste dump, but this wastes useful process liquids.

SUMMARY OF THE INVENTION

Accordingly, it is an object of this invention to provide a new and highly effective method which overcomes the deficiencies of the prior art as described above.

Another object of this invention is to provide a method of removing chloride and carbonate contaminants from strongly alkaline solutions.

Other objects and a fuller understanding of this invention may be had by referring to the following description and claims taken in conjunction with the drawings.

The present invention overcomes the deficiencies of the prior art and achieves its objectives by mixing together sodium aluminosilicate with a strongly alkaline solution, heating the solution to a temperature of at least 90 degrees Celsius to form a sodalite type product, and filtering the sodalite type product from the solution. In a preferred mode of operation, zeolite A is mixed into the strongly alkaline solution until it constitutes at least 20% of the solution, the solution is heated to a temperature of at least 90 degrees Celcius for from one to two hours to form a sodalite type product, and the sodalite type product is filtered from the solution. In the most preferred mode of operation, the solution is passed into a mixer where zeolite A is mixed into the strongly alkaline solution until it constitutes 25% of the solution; the solution is passed into an impeller reactor where it is heated to a temperature of about 150 degrees Celsius for one hour to form a sodalite type product, and the solution and sodalite type products are passed from the pressure reactor to a filter where the sodalite type product is filtered from the solution.

BRIEF DESCRIPTION OF THE DRAWINGS

In order to facilitate the understanding of this invention, reference will now be made to the drawings. The drawings should not be construed as limiting the invention but are exemplary only. In the Drawings.

DESCRIPTION OF THE PREFERRED EMBODIMENTS

In its broadest aspect, the present invention involves the removal of contaminants from alkaline solutions by mixing together sodium aluminosilicate with the solutions, heating the resulting solution to form a sodalite type product, and filtering the sodalite type product from the solution.

In a preferred embodiment of the present invention, Zeolite A is mixed into the aqueous process liquids disclosed in U.S. Pat. No. 4,041,135 so that the zeolite A constitutes about 25% by weight of the solution; the solution is heated, in a lead lined, steam heated pressure reactor to a temperature of about 150 degrees Celsius for about one hour to form a sodalite type product; and the sodalite type product is filtered from the solution.

Figure 1:
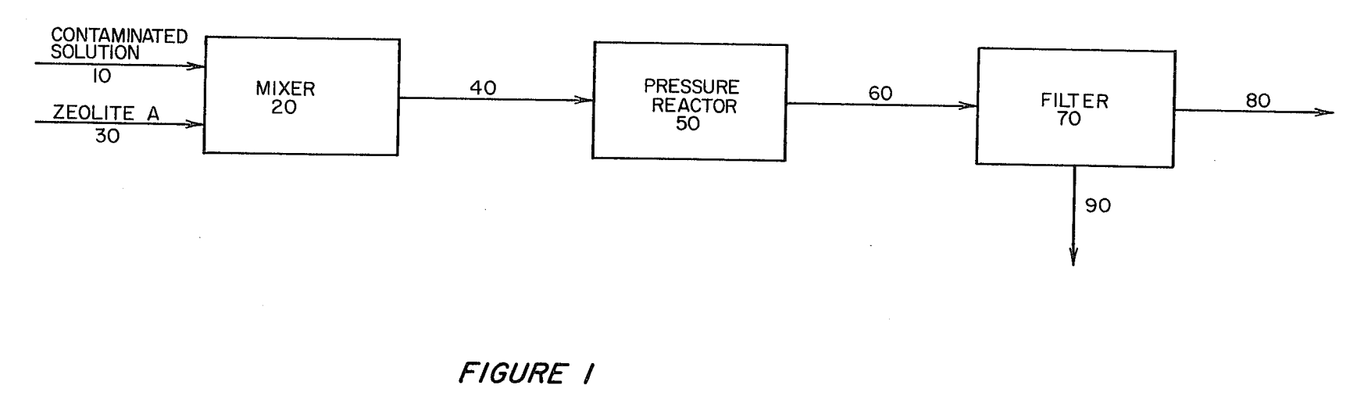
FIG. 1 is a block diagram of one embodiment of the present invention.

Referring to FIG. 1 which shows one preferred embodiment of the present invention, a contaminated strongly alkaline solution is passed through contaminant solution line 10 into impeller mixer 20 where it is mixed with zeolite A supplied through sodium aluminosilicate line 30 so that the zeolite A constitutes about 25% by weight of the solution. The resulting mixture solution is passed from impeller mixer 20 through mixture solution line 40 into pressure reactor 50 where it is heated to a temperature of about 150 degrees Celsius for about one hour to form a sodalite type product. The solution containing the sodalite type product is passed from pressure reactor 50 through reactor discharge line 60 into filter 70, wherein the sodalite type product is filtered from the solution. The solution leaves filter 70 through clarified solution discharge line 80 and the sodalite type product leaves filter 70 through sodalite type product discharge line 90.

The initial problem which this invention was designed to solve was the removal of chloride and carbonate ions from the aqueous process liquids of U.S. Pat. No. 4,041,135. U.S. Pat. No. 4,041,135 is hereby incorporated by reference to show one strongly alkaline solution that can be purified by the method of the present invention. U.S. Pat. No. 4,041,135 is also hereby incorporated by reference to show a method of producing the preferred sodium aluminosilicate used in the present invention.

In another embodiment of the present invention, the strongly alkaline solution is a sodium hydroxide solution. In this embodiment sodium aluminosilicate is mixed into the sodium hydroxide solution, the resulting solution is heated to form a sodalite type product, and the sodalite type product is filtered from the solution.

The contaminant solution must be strongly alkaline for this process to work. The term "strongly alkaline" is defined as having a sodium oxide content of at least 6% by weight of the solution. When the contaminant solution has a sodium oxide content of less than 6%, the reaction to form a sodalite type product is very slow. Examples of strongly alkaline solutions that can be treated by the present invention are sodium aluminate solutions, sodium hydroxide solutions and sodium silicate solutions.

Preferably the sodium aluminosilicate which is mixed into the strongly alkaline solution is zeolite A. One preferable sodium aluminosilicate is a zeolite A having a mean crystal size in the range of from 0.25 to 8.0 microns, a high exchange affinity for trace metal elements, and is capable of producing residual concentrations of said trace metals on the order of parts per billion produced by the process disclosed in the U.S. Pat. No. 4,041,135. Another preferable sodium aluminosilicate is a zeolite A which exhibits a narrow differential weight percent gaussian distribution with an average particle size of no more than 1.6 microns with at least 90% of the weight between 0.1 and 4.0 microns, wherein the cumulative percent population exhibits at least 64% less than one micron, with no more than 1% greater than 20 microns. This zeolite A can be produced by the process disclosed in the U.S. patent application Ser. No. 88,243 filed Oct. 25, 1979 which is hereby incorporated by reference to show a method of producing a sodium aluminosilicate useful in the present invention. Crystalline sodium alumino silicates work better in the present invention than amorphous sodium aluminosilicates, but some amorphous sodium aluminosilicates will work. The amorphous sodium aluminosilicates that work are those which have a silica to alumina molar ratio of about 2:1. Hydroxysodalite is another sodium aluminosilicate that would work.

Any type of mixing apparatus can be used to mix together the sodium aluminosilicate and the strongly alkaline solution. One preferred mixing apparatus is an impeller mixer, although a magnetic stirrer should work just as well.

Figure 4:
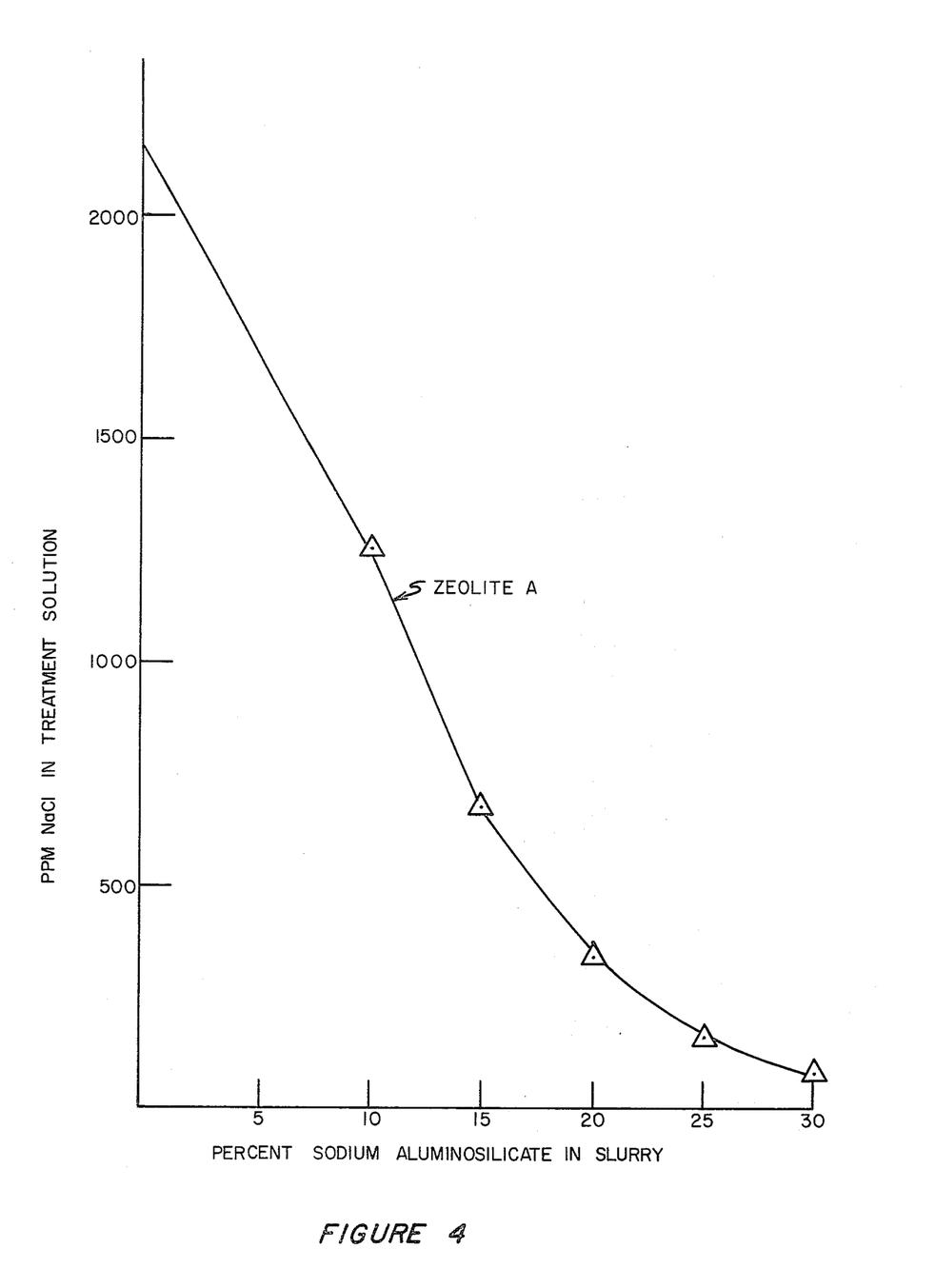
FIG. 4 is a plot of the chloride ion concentration of concentrated sodium aluminate solutions treated with zeolite A for four hours at various slurry levels. The data plotted in FIG. 4 is shown in Table IV.
Figure 5:
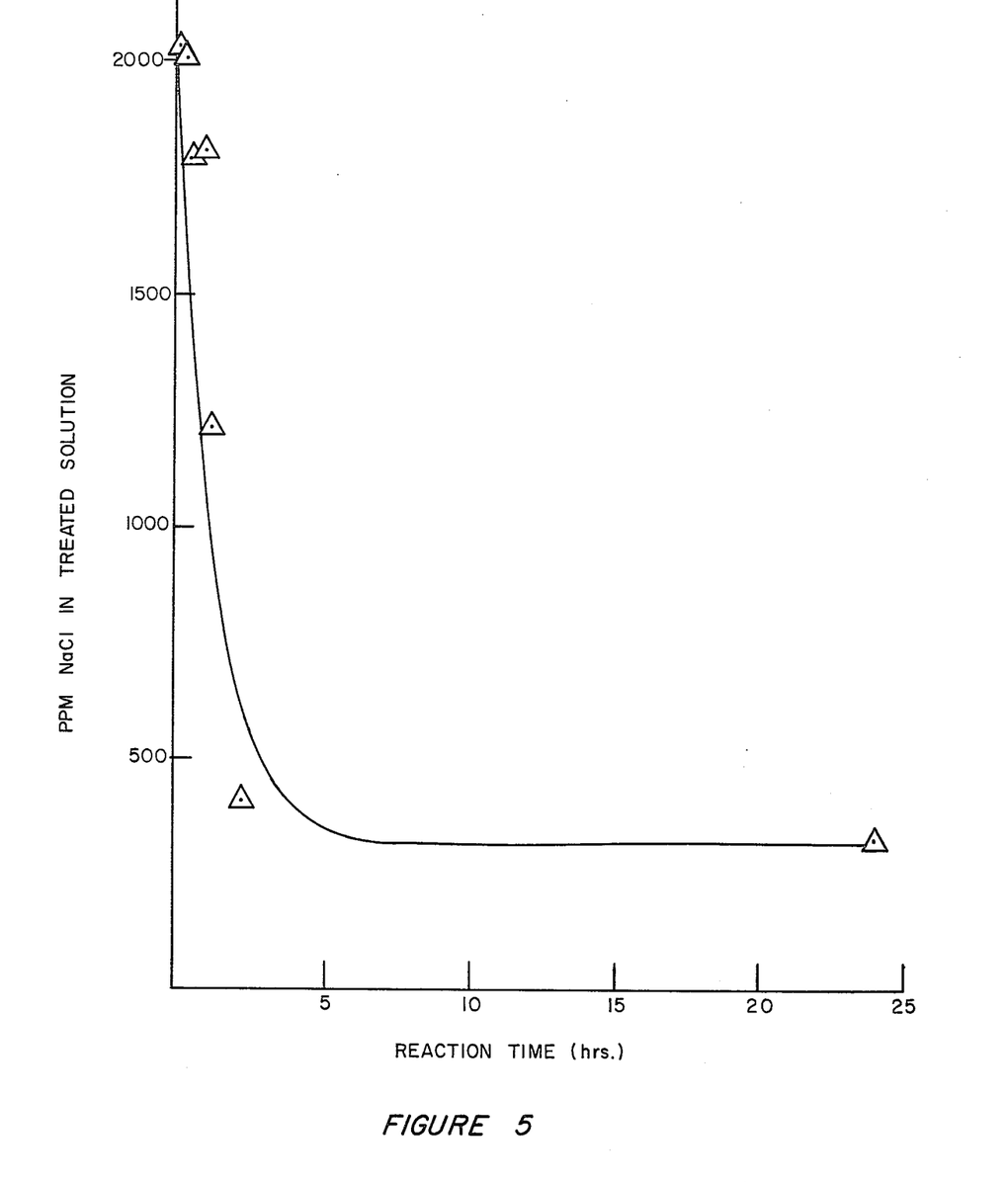
FIG. 5 is a plot of the chloride ion concentration of concentrated sodium aluminate solutions treated with zeolite A at the 20% slurry level for various reaction times. The data plotted in FIG. 5 is shown in Table V.

The sodium aluminosilicate should preferably constitute at least 20% of the solution leaving the mixture, preferably 25%. Contaminants are removed at levels of as low as 10%. When the sodium aluminosilicate constitutes less than 15% of the solution the amount of contaminants removed from the solution is proportional to the level of sodium aluminosilicate in the solution. When the sodium aluminosilicate constitutes more than 25% of the solution there is less removal of contaminant per pound of sodium alumino silicate. This relationship between the amount of sodium aluminosilicate in solution and the amount of contaminantes removed from the solution is shown in FIG. 4.

Figure 6:
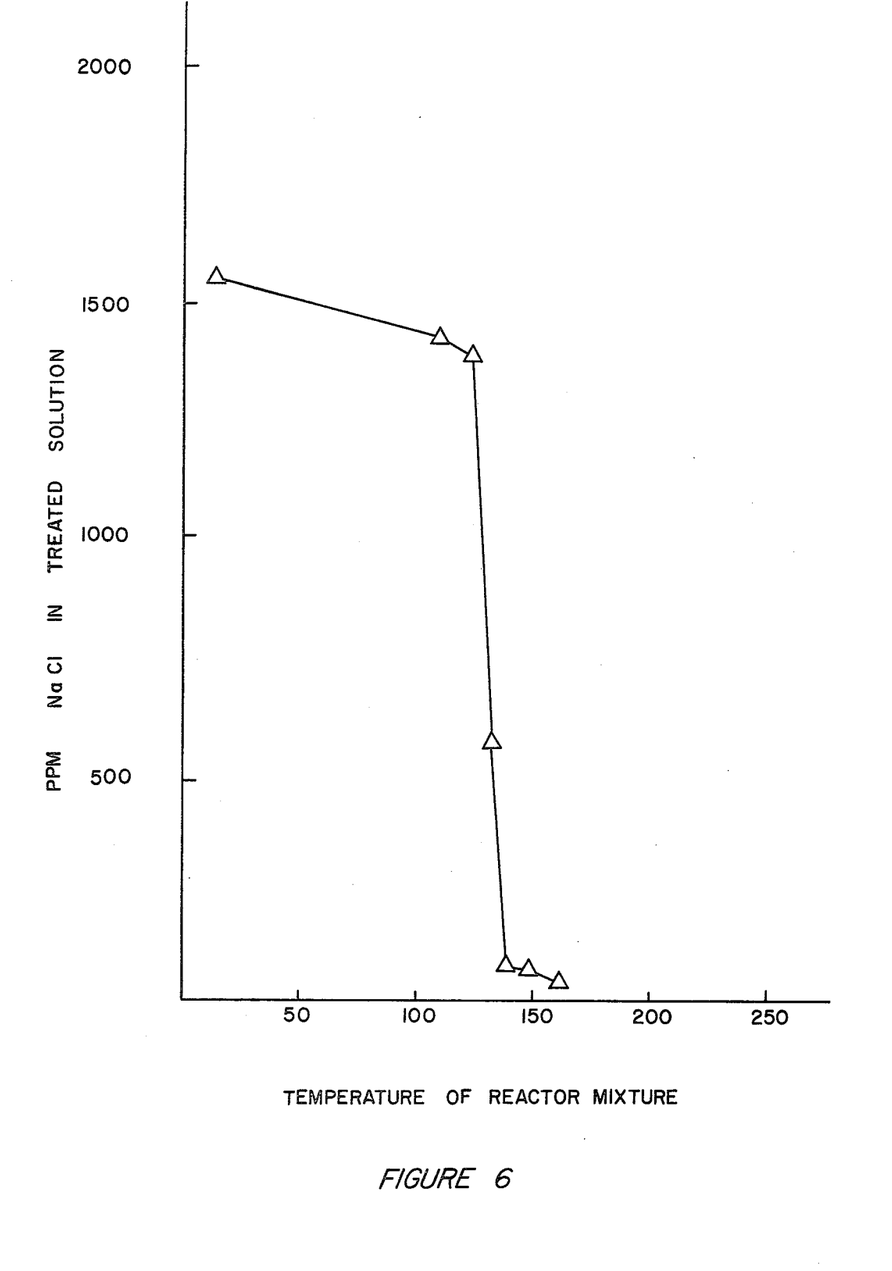
FIG. 6 is a plot of the chloride ion concentration of concentration sodium aluminate solutions treated with zeolite A at various reaction temperatures. The data plotted in FIG. 6 is shown in Table VII.

The temperature to which the solution is heated determines the amount of contaminants removed. The most significant change is between the temperatures of 120 and 140 degrees Celsius. For temperatures below 120 degrees Celsius there is little decrease in contaminant level. There is little additional change in contaminants removed for temperatures above 140 degrees Celsius. This relationship between temperature and the amount of contaminants removed from the solution at a reaction time of one hour is shown in FIG. 6.

Figure 2:
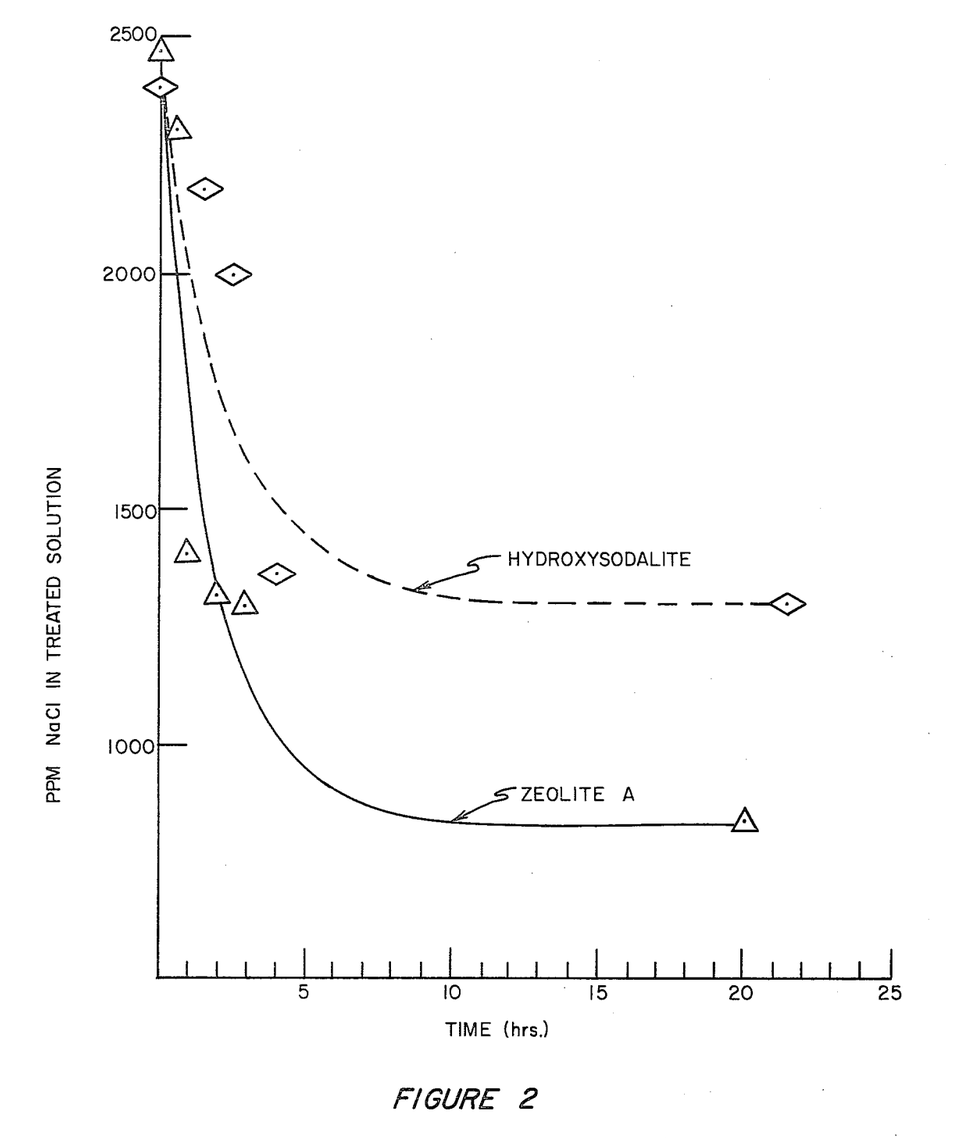
FIG. 2 is a plot of the chloride ion concentration of concentrated sodium aluminate solutions treated with zeolite A and hydroxysodalite at the 10% slurry level for various reaction times. The data plotted in FIG. 2 is shown in Tables I and II.
Figure 3:
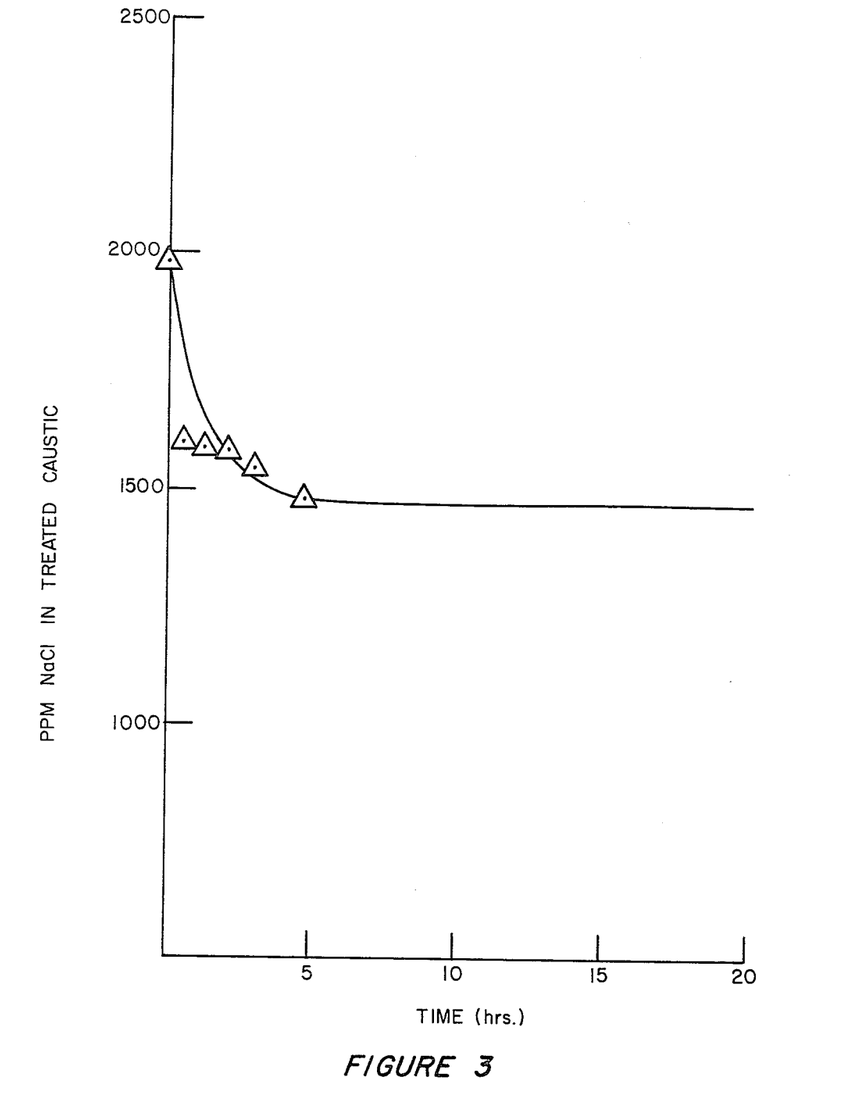
FIG. 3 is a plot of the chloride ion concentration of 25% sodium hydroxide solution treated with zeolite A at the 10% slurry level for various reaction times. The data plotted in FIG. 3 is shown in Table III.

Reaction times of one to two hours are sufficient for the reaction of sodium aluminosilicate and the strongly alkaline solution to be complete. Some contaminants will be removed at a reaction time as short as 30 minutes. Although the amount of contaminants removed increases as reaction time increases, the amount of contaminants removed in any unit of time decreases as the reaction time increases. For instance, in Examples II and III, 1067 ppm chloride is removed in the first hour, but only 87 ppm chloride is removed in the second hour. This relationship between time and the amount of contaminants removed from the solution is shown in FIG. 2.

Any type of reactor can be used to heat the solution. A pressure reactor is usually required for temperatures of above 115 degrees Celsius, since this temperature is above the boiling point of the solution.

The sodalite type product formed is a combination of hydroxysodalite, sodalite, and natrodavyne. Hydroxysodalite is also known as zeolite HS. Typically, hydroxysodalite has a sodium oxide to alumina ratio of 1:1, a silica to sodium oxide ratio of 2:1, and a water to sodium oxide ratio of 2:1. Sodalite typically has a sodium oxide to alumina ratio of 4:3, a silica to sodium oxide ratio of 3:2, and an alumina to chloride ratio of 6:1. Natrodavyne is a sodium aluminum carbonate silicate. Natrodavyne typically has a formula of $3NaAlSiO_4 \cdot Na_2CO_3$.

The sodalite type product is filtered from the solution by a regular filter. There is no need to use an elaborate or exotic filter technique.

While the applicant does not wish to be bound by any particular theory as to how this invention works, it is thought that the chloride and carbonate contaminants are removed from the solution by incorporating those contaminants into the sodalite type product. The chloride contaminants are probably incorporated into sodalite, and the carbonate contaminants are probably incorporated into natrodavyne.

PREPARATION OF ZEOLITE A

Example A

A zeolite A having a mean crystal size in the range of from 0.25 to 8.0 microns, a high exchange affinity for trace metal elements, and capable of producing residual concentrations of said trace metals on the order of parts per billion was produced by the process disclosed in U.S. Pat. No. 4,041,135 which has been incorporated by reference into the present specification to show a method of producing a preferred sodium aluminosilicate used in the present invention.

Example B

A zeolite A exhibiting a narrow differential weight percent gaussian distribution with an average particle size of no more than 1.6 microns with at least 90% of the weight between 0.1 and 4.0 microns wherein the cumulative population exhibits at least 64% less than one micron, with no more than 1% greater than 20 microns, was produced by the process disclosed in U.S. patent Ser. No. 88,243 filed on Oct. 25, 1979 which has been incorporated by reference into the present specification to show a method of producing a preferred sodium aluminosilicate used in the present invention.

EXAMPLES

The invention will be further illustrated by the following examples which set forth a particularly advantageous method and composition embodiments. While the examples are provided to illustrate the present invention, they are not intended to limit it.

The chloride ion concentration was measured by using an Orion Combination Chloride Electrode Orion Model 96-17. The chloride ion is precipitated by the addition of silver nitrate as silver chloride. The equivalence point is determined by the use of Gran's Plot Paper. This paper is corrected for 10% dilution and is an anti-semilog type paper. The Nerstian behavior of the electrode past the equivalence point allows the equivalence point to be determined by extrapolation. The error in this test is ±5-10 ppm.

The carbonate ion concentration was measured by using the carbonic acid/carbonate equilibrium's response to changes in pH as a specific electrode for the carbonate ion. An Orion carbon dioxide gas permeable membrane electrode is used. The test error is ±0.06% carbonate.

EXAMPLES I-V

In Examples I through V, 900 grams of sodium aluminate solution was passed to an impeller mixer. The sodium aluminate solution contained 15.7% sodium oxide, 2.69% alumina, 2.19% sodium carbonate and 2431 ppm sodium chloride. 100 grams of the zeolite A of Example A was mixed into the sodium aluminate solution. This solution was then passed into a reactor where it was refluxed at 110 degrees Celsius for various reaction times to form sodalite type product, then the solution and sodalite type product were passed to a filter where the sodalite type product was filtered from the solution. In the Control example, 100 grams of zeolite A of Example A was mixed into 900 grams of sodium aluminate solution, but the mixture was not refluxed. The results are shown in Table I.

TABLE I
TREATMENT OF CONCENTRATED SODIUM
ALUMINATE SOLUTIONS
WITH ZEOLITE A (10% SLURRY LEVEL)

| Example | Reaction Time, hr. | ppm Sodium Chloride | % Sodium Carbonate |
|---|---|---|---|
| Control | 0 | 2470 | 2.35 |
| I | .63 | 2303 | 2.33 |
| II | 1.0 | 1403 | 1.94 |
| III | 2.0 | 1316 | 2.01 |
| IV | 3.0 | 1301 | 1.93 |
| V | 20.0 | 832 | 1.88 |

Examples I through V show that the contaminant levels decrease as the reaction time increases. Note that the rate of decrease becomes smaller as the reaction time increases. Although 43% of the contaminants are removed in the first hour, only an additional 4% of the contaminants are removed in the next two hours.

EXAMPLES VI-IX

In Examples VI through IX, 900 grams of the sodium aluminate solution of Examples I through V was passed to an impeller mixer. 100 grams of hydroxysodalite was mixed into the sodium aluminate solution. This solution was then passed into a reactor where it was refluxed at 100 degrees Celsius for various reaction times to form a sodalite type product, then the solution and sodalite type product were passed to a filter where the sodalite type product was filtered from the solution. In the Control example, 100 grams of hydroxysodalite was mixed into 900 grams of sodium aluminate solution, but the mixture was not refluxed. The results are shown in Table II.

TABLE II
TREATMENT OF CONCENTRATED SODIUM
ALUMINATE SOLUTIONS WITH HYDROXYSODALITE

| Example | Reaction Time, hr. | ppm Sodium Chloride | % Sodium Carbonate |
|---|---|---|---|
| Control | 0 | 2398 | 2.49 |
| VI | 1.67 | 2180 | 2.51 |
| VII | 2.50 | 1998 | 2.51 |
| VIII | 4.08 | 1366 | 2.52 |
| IX | 21.50 | 1294 | 2.50 |

Examples VI-IX show that hydroxysodalite will remove contaminants. Note that the hydroxysodalite treatment did not appreciably affect the carbonate concentration.

EXAMPLES X-XIV

In Examples X through XIV, 900 grams of 25% sodium hydroxide solution containing 19.4% sodium oxide, 2.90% sodium carbonate and 2800 ppm sodium chloride was passed to an impeller mixer. 100 grams of the zeolite A of Example A was mixed into the sodium hydroxide solution. This solution was then passed into an impeller reactor where it was refluxed at 115 degrees Celsius for various reaction times to form sodalite type product. Then the solution and sodalite type product were passed to a filter where the sodalite type product was filtered from the solution. In the Control example, 100 grams of zeolite A of Example A was mixed with 900 grams of sodium hydroxide solution, but the mixture was not refluxed. The results are shown in Table III.

TABLE III
TREATMENT OF SODIUM HYDROXIDE SOLUTION
WITH ZEOLITE A

| Example | Reaction Time, hr. | ppm Sodium Chloride | % Sodium Carbonate |
|---|---|---|---|
| Control | 0 | 1967 | 2.89 |
| X | 0.58 | 1593 | 2.69 |
| XI | 1.30 | 1585 | 2.82 |
| XII | 2.15 | 1579 | 2.66 |
| XIII | 3.00 | 1533 | 2.68 |
| XIV | 4.65 | 1479 | 2.78 |

Examples X through XIV show that the chloride contaminants can be removed from sodium hydroxide solutions by this process.

EXAMPLES XV-XIX

In Examples XV through XIX, a sodium aluminate solution was passed to an impeller mixer. The sodium aluminate solution contained 16.6% sodium oxide, 3.04% alumina, 2.02% sodium carbonate and 2212 ppm sodium chloride. The zeolite A of Example A was mixed into the sodium aluminate solution to form various slurry levels. This solution was then passed into a reactor where it was refluxed at 110 degrees Celsius for four hours to form sodalite type product, then the solution and sodalite type product were passed to a filter where the sodalite type product was filtered from the solution. In the Control example, the sodium aluminate solution was refluxed for four hours without any sodium aluminosilicate being mixed into the solution. The results are shown in Table IV.

TABLE IV
EFFECT OF ZEOLITE A SLURRY LEVEL ON CONTAMINATE REMOVAL

| Example | Percent Zeolite A | ppm Sodium Chloride | % Sodium Carbonate |
|---|---|---|---|
| Control | 0 | 2212 | 2.02 |
| XV | 10 | 1244 | 1.80 |
| XVI | 15 | 678 | 1.47 |
| XVII | 20 | 336 | 1.33 |
| XVIII | 25 | 150 | .98 |
| XIX | 30 | 69 | .71 |

Examples XV through XIX show that the contaminant levels decrease as the amount of zeolite A of Example A increases.

EXAMPLES XX-XXV

In Examples XX through XXV, a sodium aluminate solution was passed to an impeller mixer. The sodium aluminate solution contained 16.22% sodium oxide, 3.51% alumina, 2.32 sodium carbonate and 1989 ppm sodium chloride. The zeolite A of Example A was mixed into the sodium aluminate solution to form a 20% zeolite A slurry. This solution was then passed into a reactor where it was refluxed at 110 degrees Celsius for various times to form sodalite type product, then the solution and sodalite type product were passed to a filter where the sodalite type product was filtered from the solution. In the Control example, the zeolite A of Example A was mixed into the sodium aluminate solution to form a 20% zeolite A slurry, but the mixture was not refluxed. The results are shown in Table V.

TABLE V
TREATMENT OF CONCENTRATED SODIUM ALUMINATE SOLUTIONS WITH ZEOLITE A (20% SLURRY LEVEL)

| Example | Reaction Time, hrs. | ppm Sodium Chloride | % Sodium Carbonate |
|---|---|---|---|
| Control | 0 | 2039 | 2.56 |
| XX | .25 | 2013 | 2.88 |
| XXI | .50 | 1805 | 2.72 |
| XXII | .75 | 1816 | 2.65 |
| XXIII | 1.00 | 1215 | 2.46 |
| XXIV | 2.00 | 409 | 1.55 |
| XXV | 24 | 316 | 1.64 |

Examples XX through XXV show that the contaminant levels decrease as the reaction time increases. Note that the rate of decrease becomes smaller as the reaction time increases. Although 80% of the contaminants are removed in the first two hours, only an additional 23% of the contaminants are removed in the next 22 hours.

EXAMPLES XXVI-XXX

In Examples XXVI through XXX, a sodium aluminate solution was passed to an impeller mixer. The sodium aluminate solution contained 16.04% sodium oxide, 2.90% alumina, 1.96% sodium carbonate, and 2211 ppm sodium chloride. The zeolite A of Example B was mixed into the sodium aluminate solution to form various slurries. This solution was then passed into a reactor where it was refluxed at 110 degrees Celsius for four hours to form sodalite type product, then the solution and sodalite type product, then the solution and sodalite type product were passed to a filter where the sodalite type product was filtered from the solution. The results are shown in Table VI.

TABLE VI
TREATMENT OF CONCENTRATED SODIUM ALUMINATE SOLUTIONS WITH ZEOLITE A OF EXAMPLE B

| Example | Percent Zeolite A | ppm Sodium Chloride | % Sodium Carbonate |
|---|---|---|---|
| XXVI | 10 | 1177 | 1.74 |
| XXVII | 15 | 711 | 1.54 |
| XXVIII | 20 | 307 | 1.14 |
| XXIX | 25 | 133 | 1.07 |
| XXX | 30 | 92 | .82 |

Examples XXVI through XXX show that the contaminant levels decrease as the amount of the zeolite A of Example B increases.

EXAMPLES XXXI-XXXVI

In Examples XXXI through XXXVI, a sodium aluminate solution was passed to an impellr mixer. The sodium aluminate solution contained 16% sodium oxide, 3% alumina, 2.0% sodium oxide and 2000 ppm sodium chloride. A virgin slurry of the zeolite A of Example A was also passed into the mixer at a ratio of about 1:1 by weight of the sodium aluminate solution. The virgin slurry contained 55% solids, 6.5% sodium oxide, 1.5% alumina, 0.8% sodium carbonate and 850 ppm sodium chloride. This mixture was passed into a stirred, lead-lined pressure reactor, and reacted at various pressures to form a sodalite type product, then the solution and sodalite type product were passed to a filter where the sodalite type product was filtered from the solution. The pressure above the reaction mix was measured and held constant for a period of one hour. The pressure of reaction was equated to that of steam and the equivalent temperature assigned. In the control example, the reaction mix was reacted at a pressure of 0 psig. The results are shown in Table VII. Table VIII shows how the composition of the sodalite type product varies for Examples XXXI through XXXVI.

TABLE VII
EFFECT OF TEMPERATURE ON CONTAMINATE REMOVAL

| Example | Reaction Pressure,psig | Reaction Temp. °C. | ppm Sodium Chloride | % Sodium Oxide |
|---|---|---|---|---|
| Control | 0 | 25 | 1550 | 1.53 |
| XXXI | 5 | 108 | 1427 | 1.51 |
| XXXII | 15 | 121 | 1387 | 1.40 |
| XXXIII | 25 | 131 | 569 | 1.07 |
| XXIV | 35 | 138 | 85 | 0.41 |
| XXXV | 50 | 148 | 77 | 0.30 |
| XXXVI | 75 | 160 | 57 | 0.29 |

Examples XXXI through XXXVI show that the contaminant levels decrease as reaction pressure and temperature increase, with the decrease in contaminant level being more pronounced at temperatures above 120 degrees Celsius.

TABLE VIII
EFFECT OF TEMPERATURE ON SODALITE COMPOSITION

| Example | Temperature °C. | % Zeolite A | Chloride | Carbonate |
|---|---|---|---|---|
| Control | 25 | 100 | 6 | 0.82 |
| XXXI | 108 | 86 | 571 | 2.74 |
| XXXII | 121 | 92 | 274 | 2.12 |
| XXXIII | 131 | 62 | 2392 | 3.76 |
| XXXIV | 138 | 0 | 3978 | 5.47 |
| XXXV | 148 | 0 | 3956 | 5.45 |
| XXXVI | 160 | 0 | 3944 | 4.93 |

Examples XXXI through XXXVI show that the nature of the sodalite type product changes as reaction temperature changes.

EXAMPLES XXXVII–XLIII

In Examples XXXVII through XLIII a sodium aluminate solution was passed to an impeller mixer. The sodium aluminate solution contained about 16% sodium oxide, 3.6% alumina, 1.9% sodium oxide and 2125 ppm sodium chloride. The zeolite A of Example A was mixed into the sodium aluminate solution to form various slurry levels. This solution was then passed into a stirred, lead-lined pressure reactor where it waa reacted at 50 psig (148 degrees Celsius) for one hour to form a sodalite type product, then the solution and sodalite type product was filtered from the solution. In the control example, the sodium aluminate solution was reacted for one hour at 50 psig without any sodium alumino silicate being mixed into the solution. The results are shown in Table IX.

TABLE IX
EFFECT OF ZEOLITE A SLURRY LEVEL ON CONTAMINATE REMOVAL

| Example | Percent Zeolite A | ppm Sodium Chloride | % Sodium Carbonate |
|---|---|---|---|
| Control | 0 | 2125 | 1.93 |
| XXXVII | 5 | 1863 | 1.99 |
| XXXVIII | 10 | 1620 | 1.72 |
| XXXIX | 15 | 1373 | 1.61 |
| XL | 20 | 930 | 1.30 |
| XLI | 25 | 604 | 1.06 |
| XLII | 30 | 558 | 0.90 |
| XLIII | 40 | 161 | 0.35 |

Examples XXXVII through XLIII show that the contaminant levels decrease as the amount of zeolite A increases.

EXAMPLE XLIV

A sodium aluminate solution was passed into an impeller mixer. The solution contained about 16% sodium oxide, 3% alumina, 1.95% sodium carbonate and 2078 ppm sodium chloride. A slurry of washed zeolite A of Example A was mixed into the solution to produce a 25% hydrous zeolite A at 20% LOI (loss on ignition). This slurry of washed wet cake was about 64% solids. The slurry was then passed to a stirred, lead-lined pressure reactor and reacted for two hours at 50 psig (148 degrees Celsius) to form a sodalite type product, then the solution and sodalite type product were passed to a filter where the sodalite type product was filtered from the solution. The resulting solution contained 0.17% sodium carbonate and 155 ppm sodium chloride.

EXAMPLES XLV–XLVI

In Examples XLV and XLVI, a sodium hydroxe solution was passed to an impeller mixer. The sodium hydroxide solution contained about 23% sodium hydroxide, 3% sodium carbonate, and 2700 ppm sodium chloride. Solid zeolite A was mixed into the solution to produce a slurry level of 25% hydrous solids (20% LOI). In Example XLV, the zeolite A was that of Example A. In Example XLVI, the zeolite A was that of Example B. The solution was then passed to a stirred, lead-lined pressure reactor and reacted for one hour at 50 psig to form a sodalite type product, then the solution and sodalite type product were passed to a filter where the sodalite type product was filtered from the solution. The resulting solution of Example XLV contained 1.57% sodium carbonate and 519 ppm sodium chloride. The resulting solution of Example XLVI contained 1.60% sodium carbonate and 385 ppm sodium chloride.

EXAMPLE XLVII

A sodium silicate solution was passed to an impeller mixer. The solution contained about 13% sodium oxide, 7% silica, 3.0% sodium carbonate, and 2500 ppm sodium chloride. To the silicate solution was added hydrous (20%) LOI zeolite of Example A to reach a 13% solids slurry. The slurry was passed to a stirred, lead-lined pressure reactor and reacted for four hours at 50 psig to form a sodalite type product, then the solution and the sodalite type product were passed to a filter where the sodalite type product was filtered from the solution. The resulting solution contained 1.48% sodium carbonate and 1566 ppm sodium chloride.

The examples show that strongly alkaline sodium hydroxide solutions or strongly alkaline sodium silicate solutions can be dechlorinated and decarbonated by treatment of the solution with a sodium aluminosilicate in a pressure reaction.

While the present invention has been described with reference to specific embodiments, this application is intended to cover those various changes and modifications which may be made by those skilled in the art without departing from the spirit and scope of the appended claims.

I claim:

1. A method of removing chloride and carbonate ions from a strongly alkaline solution comprising:
    (a) mixing sodium aluminosilicate with said solution wherein said sodium aluminosilicate is selected from the group consisting of zeolite A and hydroxysodalite wherein said sodium aluminosilicate constitutes at least 20% by weight of the solution;
    (b) heating the resulting solution to a temperature of at least 90 degrees Celsius to produce a sodalite type product; and,
    (c) filtering said sodalite type product from the solution.

2. A method of removing chloride and carbonate ions from a strongly alkaline solution comprising:
    (a) passing said solution into a mixer;
    (b) mixing zeolite A into said solution in said mixer so that said zeolite A constitutes about 25% by weight of the resulting solution;
    (c) passing said solution from said mixer to a pressure reactor;
    (d) heating said solution in said pressure reactor to a temperature of about 150 degrees Celsius for about one hour to produce sodalite type product;
    (e) passing said solution and said sodalite type product from said pressure reactor to a filter; and
    (f) filtering said sodalite type product from said solution.

* * * * *

UNITED STATES PATENT AND TRADEMARK OFFICE
CERTIFICATE OF CORRECTION

PATENT NO. : 4,289,629
DATED : September 15, 1981
INVENTOR(S) : Claude R. Andrews It is certified that error appears in the above—identified patent and that said Letters Patent is hereby corrected as shown below:

Column 3, line 67, "contaminantes" should be -- contaminants --.

Column 7, in heading of Table IV, "CONTAMINATE" should be -- CONTAMINANT --.

Column 8, lines 5-6, "then the solution and sodalite type product," should be omitted.

Column 8, in heading of Table VII, "CONTAMINATE" should be -- CONTAMINANT --.

Column 8, line 60, "XXIV" should be -- XXXIV --.

Column 9, in heading of Table IX, "CONTAMINATE" should be -- CONTAMINANT --.

Column 9, line 66, "hydroxe" should be -- hydroxide --.

Column 10, line 1, following "carbonate" the period "." should be a comma -- , --.

Column 10, line 22, "(20%) LOI)" should be -- (20% LOI) --.

Signed and Sealed this

Twenty-second Day of December 1981

[SEAL]

Attest:

GERALD J. MOSSINGHOFF

Attesting Officer  Commissioner of Patents and Trademarks